Dec. 2, 1924.
H. V. WELCH
1,517,689
PROCESS FOR THE RECOVERY OF METALLIC VALUES FROM SLAG
Filed Sept. 7, 1920
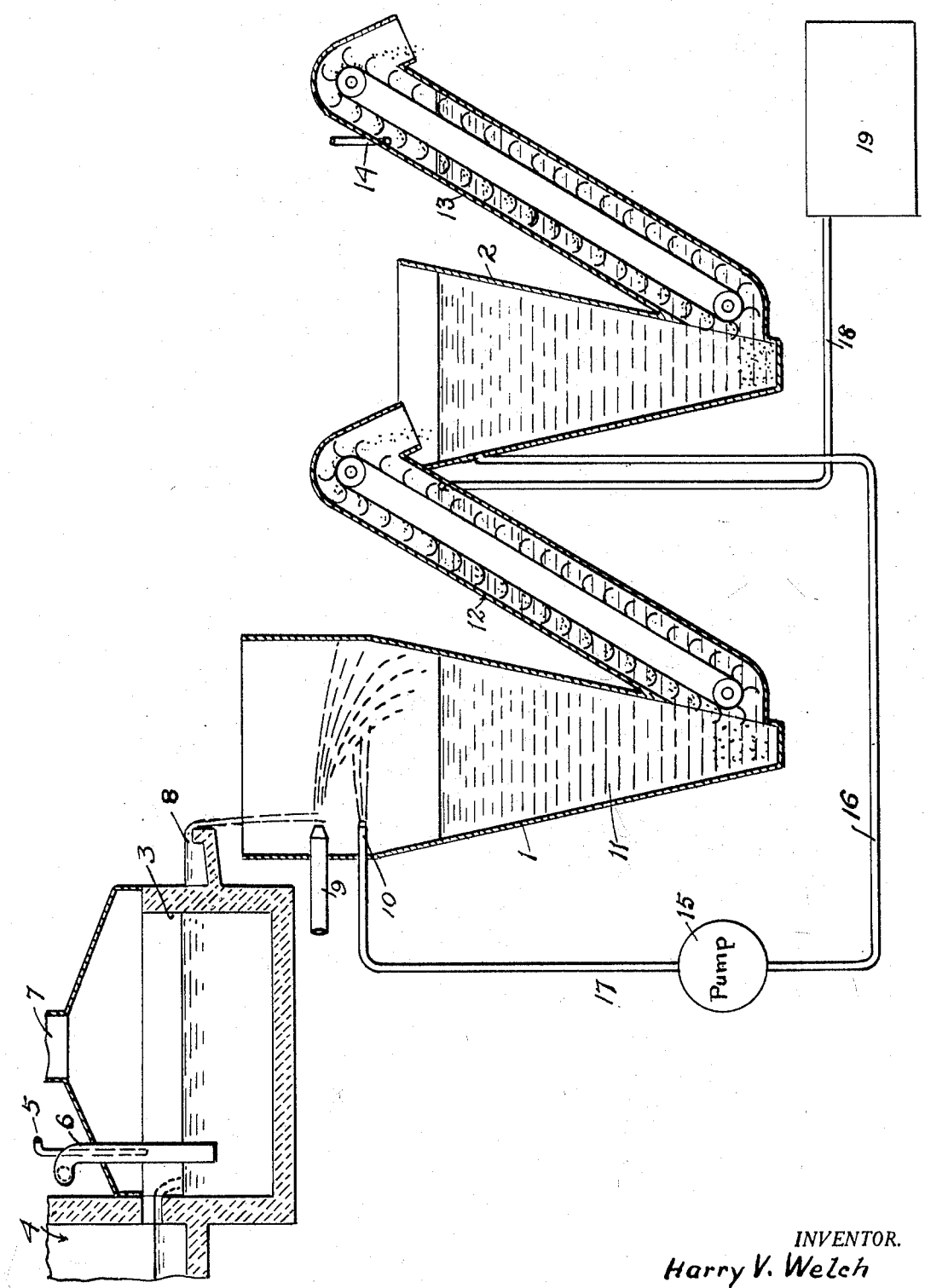
INVENTOR.
Harry V. Welch
BY Arthur P. Knight
ATTORNEY.

Patented Dec. 2, 1924.

1,517,689

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR THE RECOVERY OF METALLIC VALUES FROM SLAG.

Application filed September 7, 1920. Serial No. 408,637.

*To all whom it may concern:*

Be it known that I, HARRY V. WELCH, a citizen of the United States, residing at Los Angeles, in the county of Los Angeles, in the State of California, have invented a new and useful Process for the Recovery of Metallic Values from Slag (Case B), of which the following is a specification.

In a patent application of even date, Serial No. 408,636, I have disclosed a process and means of recovering a portion or all of the valuable metallic constituents at present being discharged in the waste and molten slags from metallurgical reduction works, in particular copper and lead smelters, such process being based on the treatment of slag with a halidizing agent.

For the particular operation in which a fraction only of the metallic halogen compounds is volatilized after their formation, I have devised a recovery process which may be used or considered as supplementary or secondary to that described in said application above, and of which the use of this supplementary process permits of much greater flexibility in the application and control of operations under the process.

Under certain conditions of operation, such as would present themselves where slags of a complex composition and unfavorable characteristics for release of volatile metallic halogen compounds which have been formed as disclosed in said application, or where through the necessities of construction, a degree of cooling takes place in the molten mixture of slag and halogen-bearing alkali or alkali earth so that proper evolution of the halogen-bearing metallic salts is not fully obtained without further expenditure of fuel to raise its temperature, or where it is not practical to introduce sufficient gas volume to wash out the metallic chloride salts or vapors existing, I have found it possible to simply and economically extract the soluble metallic halogen compounds, and under certain conditions, the metallic sulfates existing, by a leaching process as hereinafter described.

This invention may be carried out in any suitable type of apparatus, the accompanying drawing showing an apparatus suitable for this purpose, said drawing being a vertical section of such apparatus.

The apparatus shown in said drawing comprises one or more leaching agitating tanks 1 and 2, the first of which is connected to receive the outflow or slag residue from a volatilization apparatus which may be of any of the types disclosed in my application aforesaid, and may, for example, as shown, consist of a tank 3 adapted to receive the slag to be treated from a furnace in settling tank indicated at 4, said tank 3 being provided with means such as a pipe 5 for supplying a metallic halide, such as sodium chloride, and with a pipe 6 for supplying compressed air or other gas. Said tank is covered and has an outlet 7 for volatile products and an overflow spout 8 for residual slag. Said leaching tanks 1 and 2 may be of any usual or suitable type or construction adapted to perform the operations hereinafter set forth.

Above or in the upper part of the first tank 1, I provide means such as an air blast or gas blast pipe or nozzle 9 adapted to project a jet of air or other gas into the descending stream of slag residue from outlet spout 8 of the tank 3, so as to break up said slag residue into fine particles as hereinafter set forth. Means such as a pipe or nozzle 10 are also provided for injecting a jet of water or solution into the descending particles, this nozzle 10 being preferably below the nozzle 9 although they may be co-axial if desired. The tank 1 is adapted to contain a body of water or solution indicated at 11, into which the finely divided or broken up particles or granules of slag residue fall and are subjected to leaching action.

An elevator 12 may be provided for lifting the solids from the bottom of tank 1 to the top of the next tank 2, wherein they are subjected to a further leaching operation, or to washing, as the case may be. An elevator 13 lifts the solids from the bottom of the second tank to a succeeding tank or to tailings receiving means. Fresh water for washing may be supplied to the tailings outlet of the last tank, by pipe 14. Leaching solution may be returned from tank 2 to tank 1 by pump 15 whose inlet pipe 16 is connected to tank 2 and whose outlet pipe 17 leads to nozzle 10 aforesaid. Pregnant solution is conducted from tank 1 by overflow pipe 18 to any suitable precipitation tank or metal recovery apparatus 19.

The process may be carried out as follows:—The molten slag coming from a metallurgical furnace, or other apparatus, may first be treated in tank 3 by addition thereto or contact therewith of sodium chloride, or other metallic halogen compound, or equivalent material, and agitation with air or with furnace gases, and with steam or water vapor if required, so as to volatilize a portion of the metallic values therein in the form of halogen compounds; which pass off with the gases through outlet 7 and are collected in any suitable manner, for example, by electrical precipitation, or in bag houses, or spray towers. The residual slag overflows at outlet 8 forming a descending stream of molten slag, which in the present case is assumed to contain a portion or fraction of the metallic values of the slag.

As the stream of residual slag descends from the outlet 8 it is impinged upon transversely by the blast of air or gases from nozzle 9, by which the slag stream is subdivided into an enormous number of small particles or granules, which may take a form dependent on the temperature, the relative quantity and velocity of the air or gas blast compared with the mass of descending slag, the pressure of the blast, and so forth, the particles or granules forming fine pellets or shot like formation, or vesicular capsules, or a fibrous wool product, as the case may be. Under certain conditions, that is when the gas volume of blast is insufficient to remove enough heat from the slag particles to chill or bring them to solid form, it may be necessary to introduce below or adjacent to the air or gas blast, by means of nozzle 10 a spray of water or solution to cool the particles to solid state. The minute particles of solid slag are then caught in the body 11 of water or solution in tank 1, wherein they are subjected to leaching operation and from this tank the solid material is removed to the next tank of the series, the solid material moving in opposite direction to the flow of water or solution, that is, in counter current operation, by which means the most effective and economical leaching operation is secured.

Various solution agents may be used in the leaching operation described depending on the nature of the soluble values existing as halogen compounds in the slag granules. For example, if cuprous choride or lead chloride be present a brine solution may be used as an extraction agent. If copper is present in the form of an oxychloride or basic salt an acid solvent may be necessary to properly leach it. If silver chloride is present, a solution of solium thiosulfate may be advantageously used. Should lead values appear as sulfate, an acetate solution would prove desirable for its extraction. After leaching the material in this manner in any desired number of stages it may be washed in the final tank, the dilute solution from which is pumped back to the first tank.

What I claim is:

1. The process of recovering metallic values from molten metallurgical slag, which consists in bringing said slag, while still molten, in contact with a halidizing agent in an oxidizing atmosphere so as to form volatile compounds with a metallic constituent of the slag, collecting the material thus volatilized from the slag and subjecting the slag residue to leaching operation to recover metallic values therefrom.

2. The process which consists in subjecting molten slag containing metallic values to the action of a halidizing agent to produce soluble metallic compounds, causing the resulting product while in a molten condition to descend in a stream, subjecting such stream to the action of a jet of gas to cause the stream of molten slag to be subdivided into a stream of finely divided liquid particles, cooling said particles to solid state, and subjecting said particles to leaching operation to recover the soluble constituents of value contained therein.

3. The process of recovering metallic values from metallurgical slag, which consists in adding an alkali, or alkaline earth metal halide to the slag while the slag is maintained in the presence of an oxidizing atmosphere, collecting the material volatilized from the slag, causing the residual slag to be subdivided into fine particles and subjecting such particles to leaching operation with a suitable solvent, for recovering metallic values therefrom.

4. A process, as set forth in claim 3, in which the slag is subjected to the action of water vapor in addition to the action of exygen to aid in the formation of a volatile compound.

5. A process, as set forth in claim 3, in which water vapor is brought into contact with the melted slag to aid in the formation of a volatile compound.

In testimony whereof I have hereunto subscribed my name this 19th day of August, 1920.

HARRY V. WELCH.